J. W. SIMPSON.
APPARATUS FOR CURING HAY AND THE LIKE.
APPLICATION FILED JUNE 12, 1919.
1,323,416.  Patented Dec. 2, 1919.
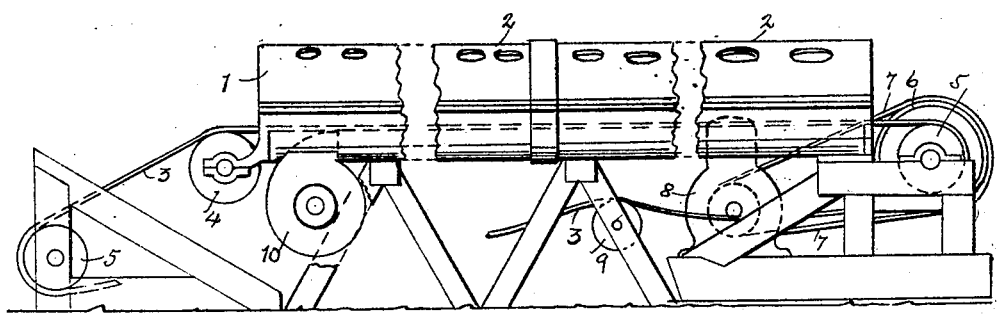
fig.1.
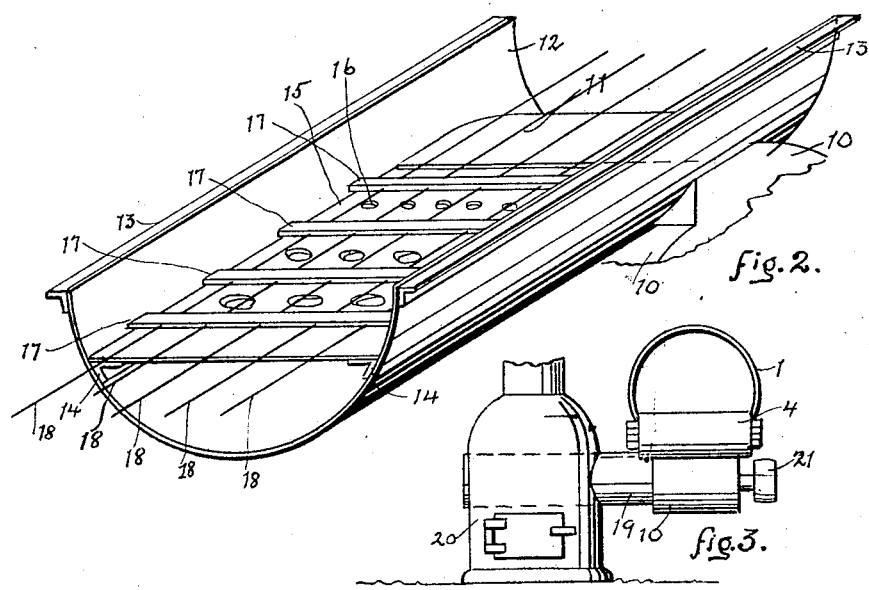
fig.2.
fig.3.
witnesses:
inventor:
John W. Simpson

UNITED STATES PATENT OFFICE.

JOHN W. SIMPSON, OF CLOVERDALE, ALABAMA.

APPARATUS FOR CURING HAY AND THE LIKE.

1,323,416.   Specification of Letters Patent.   Patented Dec. 2, 1919.

Application filed June 12, 1919. Serial No. 303,662.

*To all whom it may concern:*

Be it known that I, JOHN W. SIMPSON, a citizen of the United States, and a resident of the town of Cloverdale, county of Montgomery, State of Alabama, have invented certain new and useful Improvements in Apparatus for Curing Hay and the like, of which this is a specification, reference being had to the accompanying drawing, forming part hereof.

This invention relates to apparatus for drying out hay and like materials and the object of the invention is to provide novel, simple, efficient and inexpensive apparatus for drying such material in the field if desired and with a minimum of trouble and expense. This object is attained by the means and arrangement of parts shown herein.

In the drawing Figure 1 shows a side elevation of the apparatus; Fig. 2 a perspective view of a part, and Fig. 3 a view on same scale as Fig. 1 giving an end view of the receiving end of some of the parts.

Referring to Fig. 1, 1 is a conduit or chute formed of a plurality of separable units 2, 2, for convenience in transportation; these units taking the form of lengths of metal pipe, of diameter, say five or six feet, length ten to twenty feet—dimensions, of course, being variable. The whole is suitably supported at a suitable distance above the ground. A conveyer belt 3, 3, is arranged to travel from end to end of the chute 1 driven by one of its pulleys 5, 5, from an engine or other source of power as at 8 with driving belt 7 acting on pulley 6 with which the driving pulley or sprocket wheel 5 turns. Suitable idlers as at 9 hold up the slack of the conveyer belt. At the receiving end of the chute the conveyer belt is carried up from the lower pulley 5 on an incline to an idler roller 4 over which it enters the chute. Immediately back of roller 4 is the outlet of a blower 10, the structure being clearly indicated in Fig. 1. Hay, or like material is fed to the inclined portion of belt 3 and thus carried into and through the chute or conduit 1. Referring to Fig. 3 it is seen that the intake of the fan at 19 is through a heater or stove 20, of any suitable type, its function being to heat the air fed by the blower, 10.

Referring now to Fig. 2 it will be seen that within the lower half of the sections 2, 2, which are preferably made in halves separated longitudinally, are rails 14, 14, preferably of 45 degree angle iron, which sustain the belt 3 and also if desired the baffle plates to be described. The track system is a continuation of the outlet of the blower which appears in part to the right in the figure. 12 is the half unit of pipe, provided with flanges as angle irons 13, 13, by means of which upper and lower halves may be joined and secured. On the track rails 14, 14, or otherwise, are supported plates 15 perforated as at 16 with holes or openings which are progressively larger toward the rear of the machine and which serve to distribute the air fed below belt 3. The belt 3 is formed, preferably, as shown with a plurality of battens or cross bars 17, 17, 17, etc., fixed to wire ropes or other suitable flexible members 18, 18, 18, etc.—a short length only of belt being shown. 11 is the curved top of the blower outlet and serves as the front end of the hot air box or chamber formed by the perforated plates 15, 15, etc. The far end of this box is closed.

From the foregoing the operation is obvious. Hay, or the like material, is fed to the inclined belt and carried up and into the chute at suitable rate. Hot air is supplied by the blower, driven suitably as by a belt on pulley 21, and entering the hot air chamber beneath the belt goes upward through the hay and out through suitably graduated openings in the top and by the far end of chute 1. The distribution is made fairly uniform by the variation in sizes of the perforations in the baffle plates. The far end of the hot air chamber being closed by a segment shaped end practically all of the hot air fed in passes up through the baffle plates into the hay on the belt and out through this hay except that, its speed being greater, it traverses the hay on its way out. The result is to very effectually dry the hay or like material in its transit from one end of the apparatus to the other, and to rapidly move away the air moistened by the hay or other material.

The apparatus is very simple and inexpensive and from its peculiar structural arrangements is extremely portable, the heaviest elements, aside from motor, being the half sections of pipe or chute which can be easily nested for transportation one within another. The baffle plates 15 need not be fixed permanently as they take very little strain or none at all if desired and the whole apparatus can be knocked down and nested together to occupy very little space. The idea is to transport the whole apparatus to the field and assemble it there with the hay immediately available and give it a drying before stacking. Even a length of a hundred feet or so of chute and its necessary adjuncts can be readily transported for the tube need be only of light sheet metal stock, necessary reinforcement being had from the angle iron parts and obviously by semi-hoops of angle iron. The whole device is light, simple, extremely portable, and readily assembled and knocked down, and in practice will most efficiently effect the drying so necessary to preservation of the hay.

I do not, of course, limit myself to the proportions and precise arrangement of parts as shown as there are many obvious modifications. I prefer, however, the cylindrical form of chute, formed of a plurality of joints or sections each longitudinally separate so as to nest one within the other so as to maintain the portability of the apparatus as far as may be. No particular advantage appears to exist in fixing the several sections on wheels for they are so light that several may be loaded on a single wagon and I prefer, in practice, to support the apparatus on horses or other suitable device of like character. It is only necessary, however, to support it high enough to take care of the slack conveyer belt and it is obviously possible to take the slack above the chute and let the chute lie on the ground though the arrangement shown is probably most convenient.

Having described my invention what I claim is:—

1. In apparatus of the class described, the combination with a chute, of a conveyer belt arranged to convey material to be dried therethrough, an air conduit under said chute provided with a plurality of openings into said chute progressively increasing in diameter from front to rear, and means arranged to force heated air through said conduit and into said chute through said progressively increased openings.

2. In apparatus of the class described, the combination of a chute formed in a plurality of sections arranged to connect at their ends, a conveyer in said chute, and an air channel under said chute provided with a plurality of openings of progressively larger size from front to rear of the apparatus and means arranged to force heated air through said channel and into said chute through said progressively larger openings, substantially as set forth.

3. In combination with a source of hot air, a blower arranged to move the air, a channel connected to said blower and provided with a perforate wall in which the perforations are progressively larger from front to rear, a chute adjacent to said channel and connected therewith through said perforations and means arranged to convey material to be dried through such chute, substantially as set forth.

Witness my hand this June 7, 1919.

JOHN W. SIMPSON.

Witnesses:
JAMES E. DOWE,
ROBERT E. TROY.